(No Model.)
H. S. GOFF.
TRAP.
No. 475,215.  Patented May 17, 1892.
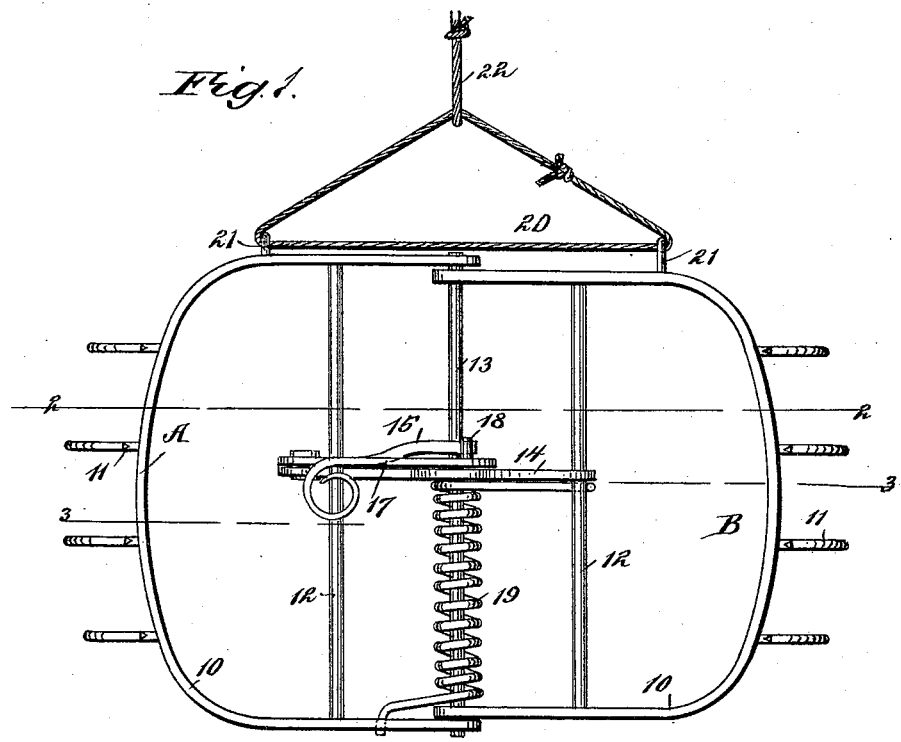
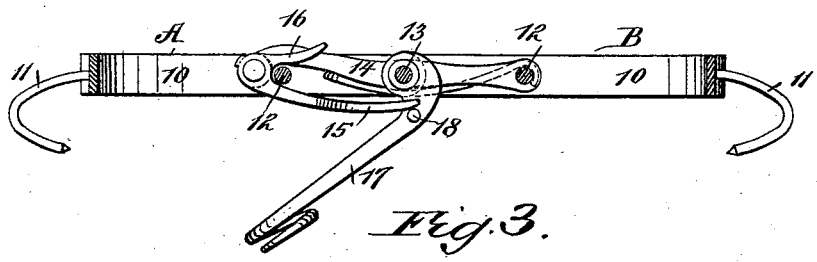
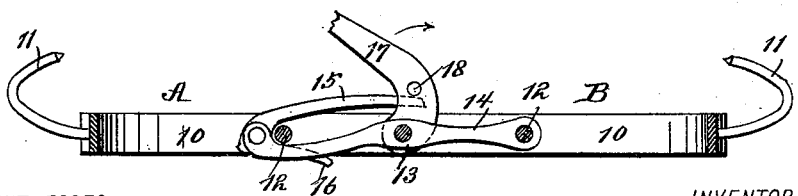
WITNESSES:  
F. McArdle.  
C. Sedgwick.
INVENTOR:  
H. S. Goff  
BY Munn & Co.  
ATTORNEYS

UNITED STATES PATENT OFFICE.

HUBBARD S. GOFF, OF ARCH BEACH, CALIFORNIA.

TRAP.

SPECIFICATION forming part of Letters Patent No. 475,215, dated May 17, 1892.

Application filed December 26, 1891. Serial No. 416,253. (No model.)

*To all whom it may concern:*

Be it known that I, HUBBARD S. GOFF, of Arch Beach, in the county of Orange and State of California, have invented a new and useful Improvement in Traps, of which the following is a full, clear, and exact description.

My invention relates to an improvement in traps, and has for its object to provide a trap capable of being conveniently set or baited without danger to the manipulator and which may be effectually employed for trapping fish or game of any description.

A further object of the invention is to construct the trap in a simple, durable, and economic manner and to so group its operative mechanism that the trap may be suspended in a vertical or be placed in a horizontal position, as the nature of the work may demand.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1 is a front elevation of the trap suspended in a vertical position. Fig. 2 is a longitudinal section taken on the line 2 2 of Fig. 1; and Fig. 3 is a similar section taken on the line 3 3 of Fig. 1, the trap being placed in a horizontal position.

The main body of the trap comprises two jaws A and B, and each jaw preferably consists of a bow-frame 10, upon the outer or rounded portion of which hooks 11, of any approved pattern, are located and a cross-bar 12 connecting the members of the bow-frame. The cross-bars are located some distance from the inner ends of the frames, and the hooks which are curved in the direction of the inner ends of the frames may be attached to the latter or may constitute an integral portion thereof. The jaws are pivotally attached at their inner ends, ordinarily through the medium of a pivot rod or pin 13, and upon this pivot rod or pin the central portion of the bridge-bar 14 is secured, one end of the said bridge-bar being attached to the cross-bar of one frame, and the other portion of the bridge-bar is sufficiently long to project beyond the cross-bar of the next frame when the jaws are open. The free end of the bridge has pivoted thereon a lock-dog 15, provided at its pivotal end with a fork 16. The main body of the dog, however, is curved and of sufficient length to extend over the pivot pin or rod of the jaws when the latter are open. The dog is maintained in the locked position by means of a trigger 17, capable of turning upon the pivot pin or rod. The outer or free end of this trigger is shaped to receive and to hold bait, and at its pivotal end a pin 18 is projected from a side of the trigger adapted to close over and to bear against the inner end of the dog when the latter is in its locked position.

The construction of the trap is completed by the addition of a spring adapted to normally draw the jaws to an engagement. The spring usually employed is coiled around the pivot pin or bar, as is designated by the reference-numeral 19, the said spring having a bearing at one end against the cross-bar of one of the jaws and upon the frame of the opposite jaw at its opposite end. The ends of the spring are not firmly attached to the jaws. Therefore, when deemed advisable, the spring may be eased up before setting the trap, and trouble by the sudden closure of the jaws upon the hand is avoided. The trap may be made of any desired material or may be of any approved size.

In the operation of the trap it is not needful that the fingers of the hand should be placed between the jaws in order to set the trap, as the act may be accomplished by forcing the two jaws open to bring them in the same horizontal plane, whereupon the cross-bar of the jaw A will enter the fork of the locking-dog, the longer end of the dog entering the jaw, while the cross-bar exerting pressure upon the shorter member of the fork will press the longer or body member downward over the pivotal pin 13, at which time the trigger may be manipulated from the back of the trap by the fingers of the hand holding the jaw A in such a manner as to throw the trigger in the direction of the locking-dog and its pin 18 over the dog. The sensitiveness of the trap is regulated by the distance the pin 18 is carried over the locking-dog.

The trap is sprung by drawing the trigger upward, and for certain kinds of game the trap is placed in the horizontal position shown in Fig. 3. For catching fish it is suspended in the vertical position, as shown in Figs. 1 and 2, by means of an endless cord 20, passed through eyes 21, located upon each jaw, and a single cord 22, having a sliding connection with the endless one. When these cords are employed, it will be observed that when the trap is sprung the endless cord will assist in keeping it in that position as tension will be exerted thereon when the trap is drawn upward through the medium of the single cord.

The jaws and their cross-bars and teeth may, if desirable, be cast in one piece.

Having thus described my invention, I claim as new and desire to secure by Letters Patent—

1. A trap comprising two spring-closed jaws having a connecting pivot-rod 13 at their inner ends, a cross-bar 12 on both jaws parallel with rod 13, a bridge-bar 14, secured to one bar 12 and the rod 13 and extending when the trap is set across the outer side of the other bar 12, a dog 15, pivoted to the free end of the bridge and notched or forked at its pivoted end to embrace the latter cross-bar, and the trigger 17, secured to the rod 13 and having a lug or shoulder 18 to engage the free end of the dog 15, substantially as set forth.

2. The combination, with two opposed jaws having a hinge connection and provided with cross-bars and a spring normally maintaining the jaws in a closed position, of a bridge projected from the cross-bar of one jaw and extending beyond that of the opposite jaw, a locking-jaw pivoted upon the free end of the bridge and provided with a fork at its pivotal end, a bait-trigger adapted for engagement with the dog, and an endless cord or strand 20, having a sliding connection with both jaws, substantially as described.

HUBBARD S. GOFF.

Witnesses:
C. W. SEXTON,
FRED L. SEXTON.